3,565,633
PHOTOGRAPHIC EMULSIONS CONTAINING CERTAIN SILVER - GELATIN CONCENTRATIONS DURING CHEMICAL RIPENING
Guenther H. Klinger, Binghamton, and Martin V. Cwikla, Johnson City, N.Y., assignors to GAF Corporation, New York, N.Y., a corporation of Delaware
No Drawing. Filed Nov. 30, 1966, Ser. No. 597,838
Int. Cl. G03c 1/02
U.S. Cl. 96—114.7                5 Claims

ABSTRACT OF THE DISCLOSURE

A process for the preparation of light-sensitive silver halide emulsions which comprises mixing together in an aqueous solution of gelatin a water-soluble silver salt and a water-soluble alkali metal halide salt to form a uniform dispersion of silver halide in gelatin, washing the dispersion and chemical ripening of the emulsion with the silver-gelatin concentration limited to a ratio of 3 to 25 parts of silver per part of gelatin during the chemical ripening stage.

---

The present invention relates in general to photography and in particular to a simplified method for the preparation of light-sensitive silver halide emulsions of improved speed, contrast, resistance to fogging, etc.

Photographic silver halide emulsions are usually prepared by mixing together a water soluble silver salt such as silver nitrate and a water soluble inorganic metal halide such as the alkali metal halides including sodium chloride, potassium bromide and/or potassium iodide in the presence of a suitable protective organic colloid such as gelatin. The gelatin-silver halide dispersion thus formed is thereafter subjected to one or more washing operations in order to remove soluble salts. The washed dispersion, i.e., emulsion concentrate, is then brought up to volume by the addition of water and gelatin, the latter being in a form specifically adapted for the ripening operation and thus the characterization "ripening gelatin." The chemical ripening operation is effected by heating the aqueous medium in the presence of the usual additives, i.e., ripening finals including, for example, sensitizing agents, antifoggants, etc., for a prescribed interval in order to optimize the sensitometric properties of the emulsion mass. After cooling, the gelatin-silver halide emulsion may be readily provided in a form suitable for coating; thus, viscosity or other adjustments may be effected in order to facilitate deposition of the emulsion in the form of a uniform continuous layer upon a suitable base material.

As will be recognized, the nature of the gelatin material employed in the manufacture of photographic emulsions is extremely critical and must necessarily conform in a number of important respects to rather precise and pre-determined criteria in order to assure realization of optimum sensitometric properties in the finished emulsion. Thus, the optimization in the finished emulsion of such photographic properties as speed, contrast, resistance to fog, storage stability, etc. will be greatly influenced by the nature of the gelatin material employed. The emulsion preparation techniques currently enjoying rather widespread commercial exploitation are uniformly characterized in requiring the addition of gelatin as an incident to at least two phases of the manufacturing process; firstly, when preparing the initial silver halide dispersion and secondly, when readying the washed dispersion for the chemical ripening step. The difficulties confronting the emulsion manufacturer have proved to be particularly problematical with respect to the selection of a gelatin product suitable for use in the ripening operation. It is imperative that the gelatin selected for such purposes contain the correct amounts of restrainers, sensitizers, aldehydes, etc., and that such material be possessed of the requisite physical properties in order to assure the obtention of a commercially feasible photographic emulsion material. The foregoing situation has tended to impose rather burdensome and stringent restrictions on the processor's scope of gelatin selection thereby circumscribing significantly the emulsion manufacturer's latitude of operations. Despite the fact that many of the substances which occur naturally in the raw material gelatins supplied to the photographic industry beneficially affect the emulsion medium, i.e., impart thereto significant ripening or sensitizing effects and in many instances improve or otherwise augment emulsion speed and contrast, it has nevertheless been found that the gelatin materials usually available on a commercial scale to the emulsion chemist are invariably unsatisfactory or otherwise inferior the primary objection being their non-uniformity, i.e., their properties as well as chemical composition vary markedly from batch to batch. This is readily understandable in view of the fact that gelatin is derived from various natural sources including the hides, bones, tendons and sinews of cattle and pigs. Consequently, the composition of the gelatin materials will vary depending upon the source as well as the process employed for its manufacture and extraction. In order to avoid problems associated with the non-uniformity characterizing the available gelatin supply, it is incumbent upon the emulsion manufacturer, as a practical matter and as a necessary incident to his operations, to accumulate relatively vast gelatin reserves. This exaggerated stockpiling of gelatin has unfortunately proved to be extremely impractical as well as costly.

In order to overcome or otherwise mitigate the aforedescribed and related disadvantages, the art has resorted to a wide variety of remedial techniques. For example, it has been widely proposed to employ inertized gelatin for ripening purposes in lieu of the conventional gelatin materials which invariably possess photographically active ingredients. The justification for this particular technique proceeds largely on the basis that inert gelatins could be readily provided having consistency of properties, composition, etc. and thereby obviate any necessity for the use of those ancillary operations which would otherwise be required. Inert gelatins in general encompass those materials in which photographically active ingredients are neutralized or otherwise rendered non-active by suitable pre-treatment. In general, such pre-treatments are designed to render all labile sulfur-containing ingredients innocuous, this being accomplished, for example, by treating the raw material gelatin with a suitable oxidizing acid such as peroxy-acetic acid, etc. Other procedures promulgated for similar purposes involve the physical removal of all sensitizing ingredients by the use of suitable absorbents, i.e., materials which exhibit specific absorptivity for the ingredients in question. Although many of such procedures have been found to be somewhat effective, it has nevertheless been determined in practice that the overall improvement obtainable by resort to such expedients is in the main marginal. Specifically, it has been ascertained that certain ingredients of the raw materials gelatin and especially the aldehydes and restrainer agents remain for the most part unaffected by the inertization process thereby tending to vitiate substantially any possibility of achieving the desired objective, namely, the provision of uniform gelatin materials having constancy of properties and composition.

The prior art methods proposed for silver halide photographic emulsion preparation have proved further objectionable from the standpoint that successful implementation was believed to require the presence of inordinately high quantities of gelatin, i.e., concentrations ranging from 6 to 8% and higher per liter of solution and especially during the ripening phase of the processing. As is well known, the chemical ripening operation, which involves heating the emulsion to a pre-determined temperature range for a prescribed period of time is accompanied by the addition of the usual adjuvants for purposes of imparting the requisite sensitometric properties. Many of such adjuvants and especially the sensitizer agents, e.g., gold salts, thiosulfate and the like, display a pronounced tendency to form complexes or otherwise combine with the gelatin molecule under the conditions employed for ripening in such manner that they are rendered incapable of exerting sensitizing effects. The loss of sensitizer thus experienced can be quite costly in view of the expense of such materials. However, despite the technological contributions heretofore provided, the aforedescribed problems are nevertheless found to persist, in many cases to an intolerable extent. Considerable industrial activity has thus centered around the research and development of materials which might serve as effective substitutes for the gelatin material and yet be devoid of the aforedescribed objectionable features. Gelatin substitutes heretofore proposed in this regard include a wide range of synthetic polymeric materials as well as derivatized gelatins. Although providing some measure of improvement, such materials are nevertheless found to suffer by comparison with gelatin as regards the vast majority of photographic applications in one or more of such vital properties as speed, contrast, fog-resistance, etc.; in addition, such materials are invariably very expensive while the added cost incurred in connection with gelatin derivatizing treatments can be prohibitive.

In accordance with the discovery forming the basis of the present invention it has been ascertained that the manifold difficulties characterizing the prior art procedure can be eliminated and that photographic silver halide emulsions having uniform composition and properties and possessed of excellent sensitometric properties may be readily and easily provided according to a procedure wherein the silver-gelatin concentration is maintained within rather precise limits.

Thus, a primary object of the present invention resides in the provision of a process for the preparation of photographic silver halide emulsions wherein the aforedescribed disadvantages are eliminated or at least mitigated to a substantial extent.

Another object of the present invention resides in the provision of a process for the preparation of photographic silver halide emulsions capable of providing an emulsion product characterized by uniformity of properties, composition, etc.

A further object of the present invention resides in the provision of a process for the preparation of photographic silver halide emulsions having excellent speed, contrast, resistance to fogging and the like.

Other objects and advantages of the present invention will become more apparent hereinafter as the description proceeds.

The attainment of the foregoing and related objects is made possible in accordance with the present invention which in its broader aspects includes the provision of a process for the preparation of photographic silver halide emulsions characterized in that any necessity for the utilization of additional gelatin during the ripening operation, i.e., apart from that included in the initial phase of the process for formation of the silver halide dispersion is completely obviated and thus readying of the washed gelatin silver halide dispersion for ripening is effected solely by the addition of water and requisite ripening finals, i.e., to the exclusion of further gelatin additions, with appropriate adjustment of pH and pAg, if required. The emulsion preparation process of the present invention is singularly characterized in that the concentration of silver is maintained within a range considerably in excess of the concentration ranges conventionally employed with prior art procedures. This of course is directly attributable to the fact that the sole gelatin present during the ripening phase is that added in the silver halide dispersion-forming step. Expressed in terms of a ratio, the silver concentrations found to be particularly beneficial for use herein range from 3.0 to about 25 g. per gram of gelatin.

One of the truly surprising features characterizing the process of the present invention and that which affords significant advantage over techniques currently known, resides in the discovery that the use of the aforedefined silver-gelatin concentration not only eliminates any need for the use of ripening gelatin, but, in addition, in no way deleteriously affects the sensitometric properties of the final emulsion produced. In fact, quite the contrary is true, i.e., it is found that such emulsion properties as contrast, speed and resistance to fogging are enhanced to a considerable extent thus making possible the formation of photographic images having superior overall reproduction quality. In accordance with standardized practice, additional quantities of gelatin or other suitable dispersant vehicle may be incorporated into the emulsion medium upon completion of the ripening operation, i.e., as a post-ripening operation for purposes of providing a more uniform dispersion of the involved ingredients as well as a viscosity more conducive to further handling. One of the further and significant advantages provided by the present invention relates to the rather drastic reduction in gelatin volume requirements for preparing the final emulsion product, i.e., such reduction substantially approximating that gelatin proportion which would ordinarily be introduced in connection with the ripening operation. Nevertheless, the use of reduced gelatin quantities in no way deleteriously affects the essential photographic properties of the emulsion product. In fact, quite the opposite is the case; as mentioned previously, the elimination of a substantial portion of the gelatin component makes possible a more efficient utilization of sensitizing ingredients.

Essentially, the process of the present invention involves the following chronology of operations; the provision of a uniform dispersion of silver halide in gelatin rendered free of soluble salts, ripening, and redispersion in a suitable protective colloid vehicle. The initial step in the process, commonly referred to as crystal formation, involves the mixing of water soluble silver salt, e.g., silver nitrate, with a water soluble alkali metal halide such as sodium chloride in an aqueous gelatin medium to form the silver halide dispersion. The soluble salts generated in situ with the silver halide, forming reaction as well as the excess quantities of water soluble reactants are thereafter removed by a simple washing treatment. The ripening operation may then be effected directly upon the emulsion medium so provided, this being conventionally accomplished by heating such medium with the addition of suitable ripening finals thereto. Upon completion of the ripening operation, and cooling of the gelatin medium, one or more suitable dispersing agents can be added in the required quantities to thereby ready the emulsion medium for coating.

The aforedescribed procedure represents a radical departure from prior art techniques and specifically with reference to the procedure directly following the emulsion washing step. At this particular juncture according to prior art processing, it was necessary to incorporate the requisite quantities of ripening gelatin usually provided as an aqueous solution or dispersion. The amount of gelatin added for such purposes was in any event sufficient to provide a gelatin concentration in the aqueous medium of at least 8 to 9% by weight, and preferably higher, and a silver-to-gelatin weight ratio of 0.5 to 1.5. As will be noted, the silver-to-gelatin weight ratios typical of prior art procedures are quite small when compared to those specified for use herein. This of course is due to the fact that additional quantities of gelatin, i.e., ripening gelatin, are added to the emulsion medium as an integral part of the ripening operation. In lieu of this particular operation, the process of the present invention provides solely for the addition of water and the usual ripening finals to the total exclusion of further gelatin addition. As will be readily obvious, any requirement for further water addition may be rendered totally unnecessary since the water added as an incident to the washing operation and/or silver halide forming step may well suffice for purposes of providing the desired gelatin concentration. It will be further understood, of course, that the total amount of gelatin employed in the silver halide dispersion forming step may be selected so as to obviate any necessity for further regulation of gelatin concentration at a subsequent step in the processing. Such a procedure affords considerable latitude to an extent heretofore considered unattainable as regards the adjustment and regulation of the properties desired in the final photographic emulsion product. With emulsion preparation techniques involving the addition of ripening gelatin, the properties obtainable in the final product are determined in large part by the collective sensitizing and/or desensitizing effects of substances contained in the gelatin employed for such purposes. This will accordingly dictate both the nature and quantities of auxiliary ingredients to be added during ripening for purposes of augmenting or abating the activity of each of such ingredients. Successful implementation of techniques of this nature necessarily involves preliminarily the carrying out of relatively exhausting testing and analysis of the gelatin material proposed for use in a ripening relationship in order to determine with unerring accuracy and precision the content of those ingredients which may possibly influence the photographic properties of the final emulsion. Possessed of this information, the emulsion maker is reasonably competent to select the appropriate types and quantities of emulsion addenda in accordance with the particular emulsion problem to be negotiated. Analytical evaluation of the aforedescribed type is, of course, time consuming and represents a significant cost increment in the overall processing. Moreover, the purposive nature of such technique is often frustrated by the fact that the photographic properties of the gelatin employed for ripening cannot be anticipated with the exactitude so vital to commercial requirements. Thus, the process involved more often than not is one of trial and error requiring in many cases modification of the final emulsion product in order to impart to the emulsion at least a reasonable approximation of the desired photographic properties.

As indicated hereinbefore, perhaps the salient advantage provided by the present invention resides in the fact that any necessity for the utilization of additional gelatin as an integral part of the ripening operation is completely obviated. However, it should be understood that the addition of relatively minute quantities of gelatin to the emulsion medium as an adjunct to the ripening operation can be effected wihout deleteriously affecting the sensitometric properties of the emulsion product provided the silver-gelatin weight ratio be confined within the aforementioned limitations.

The vastly reduced volume requirements of gelatin make possible the realization of substantial savings in a number of important respects; quite obviously, such reduction makes possible a corresponding reduction in the cost attributable to this particular component of the emulsion recipe.

Moreover, it has been found, surprisingly, that the total amount of chemical sensitizer required for the preparation of photographic emulsions in accordance with the present invention approximates but a fraction, e.g., 20% and less of the quantities correspondingly required with prior art techniques. This can possibly be explained by reference to the fact that the total amount of chemical sensitizer rendered unavailable for sensitizing purposes by virtue of complex formation or other bonding with the gelatin material is materially reduced in view of the decreased proportions of gelatin present.

As mentioned hereinbefore, the initial step in the emulsion preparation scheme involves the formation of a gelatin silver halide dispersion in aqueous media which can be readily effected by admixing, e.g., silver nitrate with a water soluble alkali metal halide, e.g., sodium chloride, potassium bromide, potassium iodide, etc. This particular phase of the operation is well known in the art, being extensively described in the published literature both patent and otherwise. In general, the proportions of water soluble alkali metal halide will range from about 1 to about 2 moles per mole of silver nitrate, depending somewhat on the dilution used. The quantities of reactants employed are selected so as to provide a total silver concentration within the range of from 2 to about 25 parts by weight per part of gelatin. Following formation of the silver halide-gelatin dispersion, excess soluble salts, e.g., potassium nitrate, potassium bromide, etc. are removed by washing, if required. The washing operation is conducted in conventional manner by utilizing conditions of water flow and temperature as well as suitable washing intervals which are promotive of salt removal. The gelatin silver halide dispersion is now in a form suitable for ripening. If for some reason the addition of further gelatin is deemed necessary or desirable, it is of vital importance that the total quantity of gelatin be such as to yield a silver-gelatin weight ratio within the aforestated range. Since the proportions of gelatin employed in the silver halide dispersion forming step should suffice for purposes of providing the concentrations necessary to efficacious ripening, further incremental additions of gelatin should be unnecessary. In any event, it should be emphasized that optimization of the improvements and advantages made possible by the present invention is attained in those instances wherein the silver-gelatin ratio regulated prior to ripening, i.e., within the specific ranges enumerated to thereby obviate completely any necessity for further gelatin addition during ripening. The ripening operation can be readily effected by heating the dispersion to temperatures within the range of from 40 to 95° C. and maintaining such temperature for a period of time which may range from 2–3 minutes up to 2 hours or more. The pH of the emulsion medium should be maintained within a range of from about 5 to about 8.5, depending upon the type of emulsion, throughout the entire ripening operation. Any necessary adjustment of pH can be effected simply by the addition of acid, e.g., a dilute solution of nitric acid or, conversely, a base, e.g., sodium hydroxide, sodium carbonate, etc., as the case may be. The pAg of the emulsion mass may be adjusted, if required, to a value within the range of 8.5 to 10.0 by the addition of water-soluble halides, e.g., chlorides, bromides and iodides, the cation of which is innocuous to photographic emulsions. Regulation of the pAg value of the emulsion in such manner usually provides a greater balance between emulsion sensitivity and fog. The ripening operation is otherwise effected in conventional manner by the addition of suitable sensitizers, restrainers and the like according to well known practice. Other additives which may be deemed desirable for incorporation into the gelatin-silver halide dispersion at this point of the operation include for example sensitizing agents, stabilizers, fog inhibitors, hypersensitizers, surface active agents and the like.

Upon completion of the ripening operation, a suitable dispersing agent is added such as gelatin, synthetic resinous materials, e.g., polyvinyl alcohol, polyvinyl pyrrolidone, etc. The amount of dispersing agent added will in general be sufficient to provide a final emulsion product having a total organic colloid concentration, i.e., initial gelatin and dispersing agent within the range of from about 0.1 to about 0.8 part per part of emulsion. The emulsion medium is then readied for coating in the usual manner.

The following examples are given for purposes of illustration only, it being understood that the invention is not limited thereto.

EXAMPLE 1

(A) The emulsion sample utilized in the following procedure is prepared according to the following method:

An X-ray emulsion is prepared by, firstly, adding the following composition:

$H_2O$—5200 ml.
$AgNO_3$—1000 g.
$NH_3$ 28%—900 ml.

to an aqueous medium having the following composition:

$H_2O$—3000 ml.
KI—22 g.
$NH_4Br$—680 g.
Gelatin—40 g.

the temperature throughout the addition being maintained at approximately 60° C. The silver halide dispersion thus obtained was comprised of crystals having an average crystal size of 1.6 microns. The emulsion was thereafter cooled to 40° C. and coagulated with 10 g. of polystyrene sulfonate, the coagulation being effected at a pH of 4.5. The resulting coagulant was washed to a conductivity of 2000–2500 mhos/cm.$\times 10^{-6}$. The emulsion medium thus prepared serves as a starting material for the ripening operation.

(B) To a sample of the above described emulsion containing 68.0 g. of silver and diluted with water to 1000 g. (gelatin concentration 3.4 g.) was added 73.4 g. gelatin (reconstitution gelatin) the pH adjusted to 6.0 with sodium hydroxide and the pAg adjusted to 9.5 with potassium bromide. Thereafter, 2.6 mg. of gold sensitizer in the form of the thiocyanate complex is added. To so prepared emulsion was thereafter ripened by heating to a temperature of 61° C. and maintaining this temperature for a period of 1 hour. Upon completion of the heating interval, the emulsion was allowed to cool to room temperature.

(C) To a sample of the emulsion described in (A) containing 68 g. of silver, 3.4 g. of gelatin, and the remainder water, was added an additional 300 g. of water. The pH of the emulsion mass was adjusted to 6.0 with sodium hydroxide and the pAg adjusted to 9.5 with potassium bromide, whereupon, 0.53 mg. of gold sensitizer in the form of the thiocyanate complex was added. The emulsion thus prepared was ripened by heating to a temperature of 40° C. and maintaining such temperature for a period of 1 hour. Upon completion of the chemical ripening operation, the emulsion was allowed to cool to room temperature whereupon 73.4 g. of polyvinyl alcohol dispersing agent and sufficient water to yield a total weight of 1000 g. were added.

Each of the above emulsion samples was readied for coating in the usual manner and applied to a cellulose acetate film base. Each of the coated samples was thereupon exposed in a Type IB sensitometer and thereafter developed for an identical period of time in an X-ray developer solution having the following composition:

Water—750 cc.
Metol—3.5 g.
$Na_2SO_3$—60 g.
Hydroquinone—9 g.
KBr—2 g.
$H_2O$ to make—1 liter.

The results obtained indicated quite clearly that the sensitometric characteristics, i.e., contrast, density, gamma, etc. of emulsion sample (C) were in no way deleteriously affected by omitting incremental gelatin additions during the chemical ripening. In fact, quite the contrary was the case, i.e., the photographic qualities obtained with emulsion sample (C) compared quite favorably when compared to emulsion sample (B). Of primary significance is the fact that the actinic response, i.e., photographic speed, of emulsion sample (C) was, if anything, superior to emulsion sample (B) despite the utilization of the gold salt sensitizer in an amount approximating ⅕ of the amount employed with emulsion sample (B). This of course represents an outstanding improvement since it makes possible relatively drastic reductions in the quantity of sensitizer ingredient required to achieve adequate photographic speed, and thus minimizes to an extent heretofore considered unattainable, the costs involved.

The following example illustrates the present invention with respect to the preparation of a silver halide emulsion of the fast-boiled type.

EXAMPLE 2

(A) An aqueous solution of silver nitrate (500 g.) and water (3100 ml.) was added to the following solution:

$H_2O$—2700 ml.
KBr—360 g.
KI—40 g.
Gelatin—50 g.

the temperature throughout the addition being maintained at approximately 70° C. The average crystal size of the silver halide particles was approximately 0.8 micron. The emulsion mass was thereafter cooled to 40° C. and coagulated with 12 g. of polystyrene sulfonate at a pH of 4.5. The coagulant was then washed to a conductivity of 1700–1800 mhos/cm.$\times 10^{-6}$.

(B) To a sample of the above described emulsion containing 41 g. of silver and diluted with water to 1000 g. was added 80 g. of gelatin (reconstitution gelatin), the pH adjusted to 6.5 with sodium hydroxide and the pAg adjusted to 9.0 with potassium bromide. Thereafter, 1.6 mg. of gold sensitizer in the form of the thiocyanate complex was added. The emulsion mass was then chemically ripened by heating to a temperature of 53° C. and maintaining such temperature for a period of 70 minutes. Upon completion of the ripening operation, the emulsion medium was allowed to cool to room temperature.

(C) To a sample of the emulsion described in (A) containing 41 g. of silver (total weight 93.0 g.) is added 300 g. of water. The pH is adjusted to 6.5 with sodium hydroxide and the pH adjusted to 9.4 with potassium bromide. Thereupon, 0.24 mg. of gold sensitizer in the form of the thiosulfate complex is added. Chemical ripening is effected by heating the emulsion mass to a temperature of 50° C. and maintaining such temperature for 1 hour. Upon completion of the ripening operation, 80.0 g. of polyvinyl alcohol and sufficient water to provide a total weight of 1000 g. was added.

Each of emulsion samples (B) and (C) was coated upon a cellulose acetate film base and exposed under identical conditions in a type IB sensitometer. Each of the exposed elements was thereafter developed under identical conditions utilizing a standard black and white developer. The results obtained are similar to those described in Example 1, i.e., despite the use of reduced quantities of gold sensitizer, the photographic speed and sensitometric characteristics of emulsion sample (C) compare favorably with sample (B).

The improvements made possible by the present invention are made manifestly clear by reference to the results obtained with the control examples, i.e., emulsion preparation techniques based upon the utilization of further gelatin additions as an incident to the ripening operation. Results of the more conventional prior art techniques compare with those provided by the subject invention only in those instances involving the use of extremely protracted developing intervals which would in any case be rarely employed in commerce. Thus, it will be realized that for the broad spectrum of photographic applications the subject invention offers very real and distinct advantages over the techniques currently promulgated.

The process of the present invention may be readily and conveniently employed for the preparation of light sensitive silver halide emulsions of the so-called black and white type or conversely, for the preparation of emulsions specifically adapted to carry color component images. Pursuant to the accomplishment of the latter objectives, suitable color developing agents and/or color coupling components may be incorporated into the emulsion medium at any convenient stage of its preparation. In any event, regardless of the particular photographic application in question, the unique advantages made possible by the present invention will be very much in evidence.

Although the subject invention has been explained with particular reference to the use of gelatin in the silver halide-dispersion forming step, it will be understood that other materials may be employed in part for such purposes. Thus, the gelatin may be utilized in suitable admixture with any of the water-sensitive, i.e., water soluble and/or water permeable organic colloids including polymeric materials of both synthetic and natural origin.

The present invention has been disclosed with respect to certain preferred embodiments thereof, and there will become obvious to persons skilled in the art various modifications, equivalents or variations thereof which are intended to be included within the spirit and scope of this invention.

What is claimed is:

1. A process for the preparation of light-sensitive silver halide emulsions comprising mixing together in an aqueous solution of gelatin a water soluble silver salt and a water soluble alkali metal salt to form a uniform dispersion of silver halide in gelatin; washing the dispersion to remove soluble salts followed by chemical ripening of said dispersion, the improvement which comprises limiting the silver-gelatin concentration during chemical ripening to a value within the range of from about 3 parts to about 25 parts of silver per part of gelatin.

2. A process according to claim 1 wherein said water soluble silver salt comprises silver nitrate.

3. A process according to claim 1 wherein the ripening operation is effected by heating the silver halide emulsion medium at a temperature within the range of from about 40° C. to about 95° C. for a period ranging from about 2 minutes to about 2 hours.

4. A process according to claim 1 wherein following completion of the ripening operation, the emulsion is redispersed in a hydrophilic colloid.

5. A process according to claim 4 wherein said hydrophilic colloid comprises gelatin.

References Cited
UNITED STATES PATENTS

| | | | |
|---|---|---|---|
| 2,611,716 | 9/1952 | Robijns | 96—94 |
| 2,982,652 | 5/1961 | De Pauw et al. | 96—94 |
| 3,153,593 | 10/1964 | De Pauw | 96—94 |

NORMAN G. TORCHIN, Primary Examiner

J. R. HIGHTOWER, Assistant Examiner